March 4, 1969  C. GLANDIN  3,431,171
FUEL ASSEMBLY FOR NUCLEAR REACTORS WITH FUEL RODS
POSITIONED BY SPRINGS CARRIED BY A GRID
Original Filed May 17, 1965  Sheet _1_ of 2
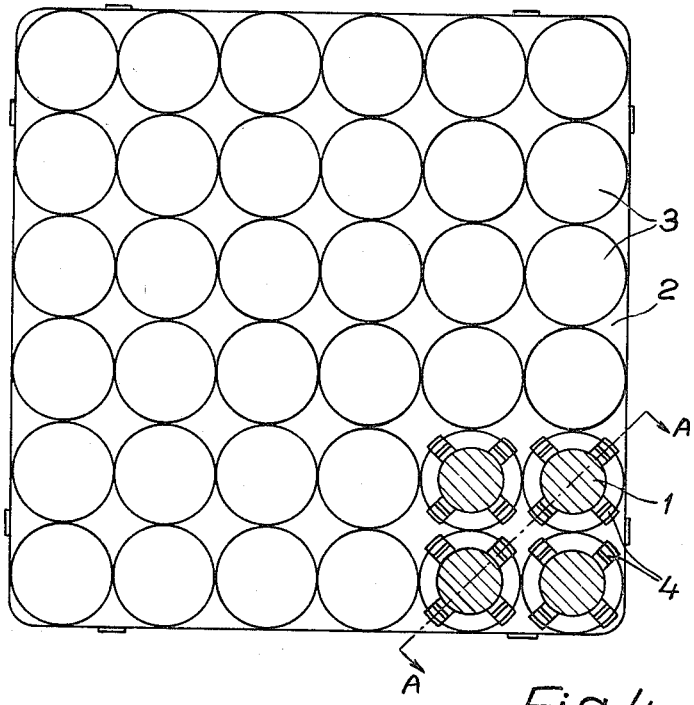
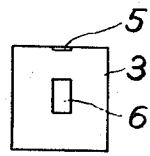
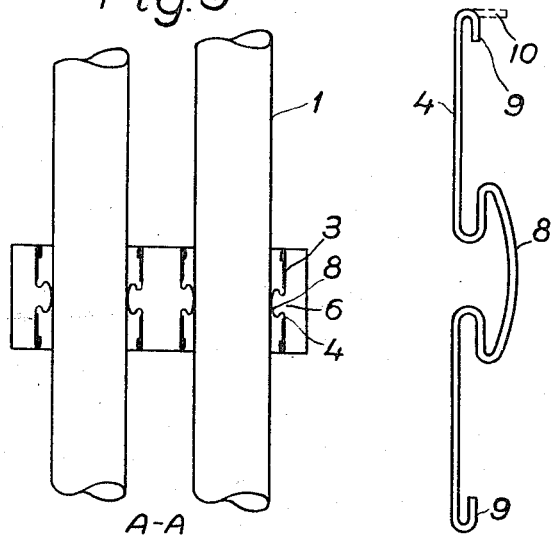
INVENTOR.
Constan Glandin
BY
Bailey, Stephens + Huettig
ATTORNEYS

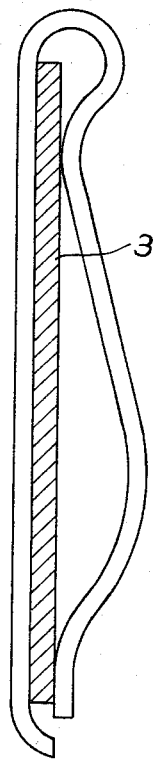
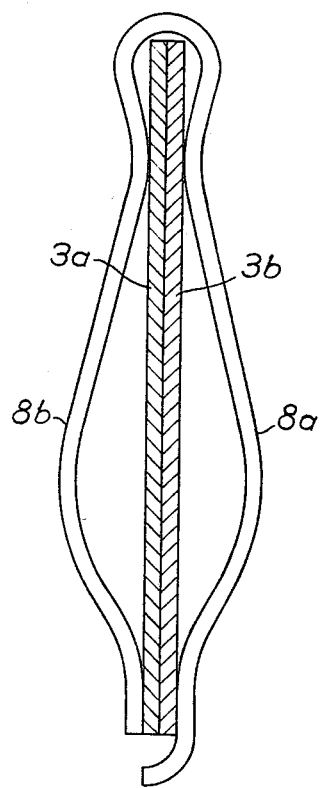
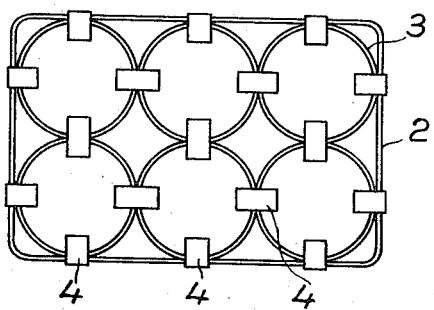

United States Patent Office 3,431,171
Patented Mar. 4, 1969

3,431,171
FUEL ASSEMBLY FOR NUCLEAR REACTORS WITH FUEL RODS POSITIONED BY SPRINGS CARRIED BY A GRID
Constan Glandin, Vasteras, Sweden, assignor to Allmänna Svenska Elektriska Aktiebolaget, Vasteras, Sweden, a corporation of Sweden
Original application May 17, 1965, Ser. No. 456,234, now Patent No. 3,380,890, dated Apr. 30, 1968. Divided and this application Apr. 24, 1967, Ser. No. 633,675
Claims priority, application Sweden, June 3, 1964, 6,722/64
U.S. Cl. 176—78  11 Claims
Int. Cl. G21c 3/30

ABSTRACT OF THE DISCLOSURE

The rods in a nuclear reactor fuel assembly are positioned by a grid formed of rigid spacers extending longitudinally of the rods and having elongated springs also extending longitudinally of the rods engaging the rods at angularly spaced points to position the rods.

This application is a division of Ser. No. 456,234, filed May 17, 1965, and now U.S. Patent No. 3,380,890.

BACKGROUND OF THE INVENTION

Field of the invention

The present invention refers to a fuel assembly for atomic reactors which comprises a number of parallel fuel rods and spacers for fixing the distance between the fuel rods.

Background of the invention

In fuel assemblies which comprise a plurality of parallel fuel rods, the end of the rods and often also a plurality of points between the ends must be fixed with the help of so-called spacers in order that the distance between the rods may be kept constant for the whole length of the rods. During operation the rods are subject to vibrations and the spacers must therefore be of relatively robust construction. In order to avoid erosive vibration movements between the fuel rods and the spacers, a certain resilient support pressure must be maintained between them. During the assemblage however the support between the spacers and the fuel rods should not cause scratches in the coating of the fuel rods. The contact surface between the fuel rods and the spacers should not be too large either, since in such a case the flow of the coolant is prevented at this point and local overheating occurs. The coolant flow around the fuel rods should not in other respects be prevented by the spacers to any appreciable extent. Known spacer constructions do not completely fulfill the above mentioned requirements and are besides often relatively complicated and expensive to manufacture.

SUMMARY OF THE INVENTION

The object of the present invention is to effect a simple spacer, easy to assemble, causing but little strain upon the fuel rods mechanically as well as thermically and preventing only to a very small degree the cooling water flow through the fuel assembly. By means of the invention the advantage is also attained that faults in a part of the spacer can in most cases only lead to one of the fuel rods becoming loose, while the fixing of the remaining fuel rods is not affected. Besides, a stable spacer construction is attained which counteracts oscillations in the fuel assembly.

The invention is characterised in that the spacers each comprise a rigid spacer body formed of tube elements surrounding the fuel rods and spacer springs fastened to the tube elements and arranged to bear against the fuel rods. The spacer springs can be made of spring elements separated from each other, of which at least three, preferably four, are arranged to bear against one and the same fuel rod and which are fitted on the spacer body during assemblage of the fuel assembly.

BRIEF DESCRIPTION OF THE DRAWINGS

The invention will now be described more fully with reference to the accompanying figures which show schematically different embodiments of the invention. FIG. 1 shows an axial view of a spacer according to a first embodiment of the invention. FIG. 2 shows a side view of one of the tube elements of the spacer shown in FIG. 1. FIG. 3 shows the section A—A in FIG. 1. FIG. 4 shows on a greater scale a side view of a type of spacer spring. FIGS. 5 and 6 show spacer springs of another type. FIG. 7 shows an axial view of a fuel assembly intended for spacer springs according to FIG. 6.

DESCRIPTION OF THE PREFERRED EMBODIMENTS

In the figures, 1 designates the fuel rods and 2 the outer frame of the spacer body. Inside the frame 2 the spacer body comprises a number of circular, rectangular or square tube elements 3, which are arranged in rows at right angles to each other and soldered or welded to each other at the contact points and also in the same way attached to the frame 2. The soldering is effected suitably by means of furnace soldering. In FIGS. 1 and 7 the tube elements 3 are circular.

In FIG. 1 only a few of the fuel rods 1 have been drawn in their respective tube elements. The rods 1 are fixed in the centres of the tube elements 3 by means of spacer springs 4, of which four are fastened on each tube element. The spacer body is manufactured suitably of a material with low neutron absorbing properties, for example of the alloy Zircaloy 2. Stainless steel is also a suitable material in certain types of reactor.

In FIG. 2 a tube element 3 is shown, seen from the side. At one edge of the tube there is a cut 5 for peripheral fixing of the spacer spring. In the middle of the tube element there is an opening 6 through which a support member arranged on the spacer spring extends for bearing against the fuel rod.

The mounting of the spacer springs is shown more clearly by FIG. 3. In the embodiment shown the spacer springs 4 are mounted on the outside of the tube element 3 and the support member 8 extends through the previously mentioned opening 6.

In FIG. 4 the spacer spring according to FIGS. 1 and 3 is shown on a greater scale, seen from the side. The spacer spring 4 is made of a bent plate strip of some suitable spring material, for example a tempered nickel-chrome-iron alloy. The support member 8 is in the embodiment according to the figure manufactured as a bent part of the spring plate. Through this embodiment the advantage is gained that the support member 8 itself also becomes resilient and that smaller movemnets in the axial as well as in the radial direction can be effected by the spacer spring without any sliding at the surface of contact with the fuel rod taking place. In order that the spacer spring may be able to withstand axial movements it is important that the connection between the support member 8 and the web of the spring is relatively pliable. This has been effected in the embodiment according to the figure by giving the support member 8 a mushroom-like shape. By this means the support member also becomes resilient in the radial direction. It can of course also be feasible to make the spacer spring with a separately mounted support member instead of the bent part 8, as along as this is more suitable. The spacer springs are provided at their ends with gripping flanges 9 one of which at least is usually first bent to the correct position during mounting. In such a case the spring has the form which is shown in broken lines at 10 before it is mounted on the tube element of the spacer body. If the bend 8 permits axial elongation of the spacer spring, it is possible to have the gripping flanges 9 completed before mounting.

Mounting of the spring elements of a fuel rod position can be carried out after the fuel rod has been inserted in this position or the fuel rods can be inserted afterwards in the complete spacer. The latter process however requires the fuel rods to be protected against scratching, for example by using protecting intermediate layers of plastic or the like, which are removed after the completion of the mounting. It can also be suitable to secure the fastening of the springs by soldering or possibly by welding.

FIG. 5 shows a spacer spring of another construction. This spring is intended to be drawn over the tube element. This spring shape can be easily modified so that it becomes double-acting as shown in FIG. 6. The spring is here formed with two support members 8a and 8b in the form of bent arcs. This spring type is used suitably in cases where the spring is fitted at the contact line between two tube elements 3a and 3b lying near each other. An example of a spacer of this type is shown in FIG. 7. Specially with this type of spacer, cross sections of the tube element other than the circular type can be suitable, for example a six-sided shape which gives a relatively rigid spacer body.

What is claimed is:
1. A fuel assembly for nuclear reactors comprising a plurality of parallel fuel rods and a spacer fixing the distance between the fuel rods, said spacer comprising a rigid spacer body of grid-like configuration and spacer springs of resilient material different from the material of the spacer body attached to the spacer body and bearing against said fuel rods, said spacer springs comprising elongated members extending longitudinally of the rods.

2. A fuel assembly according to claim 1, the spacer springs including for each fuel rod at least three spring elements bearing against the same fuel rod and angularly spaced around the axis thereof.

3. A fuel assembly according to claim 1, the spacer body consisting mainly of a plurality of connected tube elements.

4. A fuel assembly according to claim 3, the tube elements being arranged in rows perpendicular to each other.

5. Assembly according to claim 3, each tube element having an opening in its wall, said spacer springs being secured on the outside of said tube elements and each having a support member extending inwardly through said opening in the tube element and bearing against the fuel rod.

6. A fuel assembly according to claim 5, said spacer spring comprising a bent strip of spring material, said support member being positoned intermediate the ends of said strip.

7. A fuel assembly according to claim 6, said support member comprising a resilient bent portion of said spacer spring strip.

8. In a fuel assembly according to claim 6, said spacer spring having gripping flange means to grip the edge of a tube element.

9. A fuel assembly according to claim 3, said spacer springs comprising clips clamped to the wall of said tube elements.

10. A fuel assembly as claimed in claim 1, each spring having end portions operatively engaging the spacer body and a central part engaging a fuel rod.

11. Spacer for a nuclear fuel assembly comprising a rigid body of a plurality of connected parallel tube elements and elongated spacer springs separate from the tube elements and of a different material from the material of the tube elements extending longitudinally along said tube elements, said tube elements being provided at their ends with axial cuts receiving at least one end portion of each spacer spring.

References Cited

UNITED STATES PATENTS

| 3,182,003 | 5/1965 | Thorp et al. | 176—78 |
| 3,197,381 | 7/1965 | Blake | 176—78 X |
| 3,212,991 | 10/1965 | Brynsvold et al. | 176—78 |
| 3,228,854 | 1/1966 | Bekkering et al. | 176—78 |
| 3,240,680 | 3/1966 | Laithwaite et al. | 176—76 X |
| 3,301,765 | 1/1967 | Eyre et al. | 176—76 X |
| 3,314,860 | 4/1967 | Wilman | 176—78 |
| 3,324,008 | 6/1967 | Howieson et al. | 176—76 X |
| 3,377,254 | 4/1968 | Frisch | 176—78 |

LELAND A. SEBASTIAN, *Primary Examiner.*

M. J. SCOLNICK, *Assistant Examiner.*

U.S. Cl. X.R.

176—76